United States Patent
Hui et al.

(10) Patent No.: US 10,916,937 B2
(45) Date of Patent: Feb. 9, 2021

(54) POWER SYSTEM WITH AN OVERHEAT DETECTION CIRCUIT

(71) Applicant: ASUSTeK COMPUTER INC., Taipei (TW)

(72) Inventors: Kang-Xiang Hui, Taipei (TW); Zhao-Long Dong, Taipei (TW); Ching-Ji Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 250 days.

(21) Appl. No.: 16/151,642

(22) Filed: Oct. 4, 2018

(65) Prior Publication Data

US 2019/0123550 A1 Apr. 25, 2019

(30) Foreign Application Priority Data

Oct. 19, 2017 (CN) .......................... 2017 1 0976228

(51) Int. Cl.
*H02H 9/02* (2006.01)
*G01K 7/24* (2006.01)
(Continued)

(52) U.S. Cl.
CPC .............. *H02H 9/026* (2013.01); *G01K 3/005* (2013.01); *G01K 7/24* (2013.01); *H02M 1/32* (2013.01);
(Continued)

(58) Field of Classification Search
CPC . H02M 2001/0009; H02M 2001/0025; H02M 3/156; H02M 3/158; H02M 3/335;
(Continued)

(56) References Cited

U.S. PATENT DOCUMENTS 4,175,418 A * 11/1979 Steffen .................... A01F 25/08
374/112
7,236,381 B2 * 6/2007 Ohno ...................... H02J 1/102
363/95

(Continued)

FOREIGN PATENT DOCUMENTS

CN 104866054 A 8/2015
TW M391128 U 10/2010

*Primary Examiner* — Gustavo A Rosario-Benitez
(74) *Attorney, Agent, or Firm* — McClure, Qualey & Rodack, LLP

(57) ABSTRACT

A power system includes a control circuit, a power conversion circuit, a current detection circuit and a overheat detection circuit. The control circuit is for generating one or more pulse signal. The power conversion circuit is electrically coupled to the control circuit, for generating an output current according to the pulse signal. The current detection circuit is electrically coupled to the power conversion circuit, for generating a sensing current according to the output current. The overheat detection circuit is electrically coupled to the current detection circuit and the control circuit, for generating the correction current according to a temperature of the power conversion circuit. The control circuit adjusts a duty ratio of the pulse signal according to a correction sensing current to adjust the output current, and the correction sensing current is a sum of the value of the sensing current and the correction current.

5 Claims, 4 Drawing Sheets

(51) Int. Cl.
  *H02M 1/32* (2007.01)
  *G01K 3/00* (2006.01)
  *H02M 1/00* (2006.01)
(52) U.S. Cl.
  CPC ............... *H02M 2001/0009* (2013.01); *H02M 2001/327* (2013.01)
(58) Field of Classification Search
  CPC .. H02M 1/32; H02M 2001/327; H02H 9/026; H02H 3/085; H02H 5/04; H02H 5/042; H02H 5/047; H02H 7/1203; G01K 3/005; G01K 7/24
  See application file for complete search history.

(56) References Cited

U.S. PATENT DOCUMENTS

| | | | |
|---|---|---|---|
| 2006/0083031 A1* | 4/2006 | Cook, II | H02M 1/32 363/20 |
| 2008/0212345 A1 | 9/2008 | Yamashita et al. | |
| 2009/0315575 A1* | 12/2009 | Yoshioka | G01D 3/021 324/705 |
| 2010/0320974 A1* | 12/2010 | Manlove | H02M 3/157 323/222 |
| 2011/0102052 A1* | 5/2011 | Billingsley | H01H 9/542 327/365 |
| 2011/0127974 A1* | 6/2011 | Fukushi | H02M 3/156 323/271 |
| 2011/0194223 A1* | 8/2011 | Kang | H02M 5/042 361/106 |
| 2013/0187619 A1* | 7/2013 | Dunipace | H02M 3/156 323/225 |
| 2015/0131335 A1* | 5/2015 | Miyamoto | H02M 3/33507 363/21.01 |
| 2015/0309090 A1* | 10/2015 | Akahane | H02H 3/08 324/537 |
| 2016/0261202 A1* | 9/2016 | Kikuchi | H02M 3/33523 |
| 2017/0268919 A1* | 9/2017 | Hirata | G01F 23/241 |
| 2018/0159433 A1* | 6/2018 | Oe | H02M 1/143 |
| 2018/0219484 A1* | 8/2018 | Mercer | G01R 1/203 |

* cited by examiner

POWER SYSTEM WITH AN OVERHEAT DETECTION CIRCUIT

CROSS-REFERENCE TO RELATED APPLICATION

This application claims the priority benefit of Chinese application serial No. 201710976228.8, filed on Oct. 19, 2017. The entirety of the above-mentioned patent application is hereby incorporated by reference herein and made a part of the specification.

BACKGROUND OF THE INVENTION

Field of the Invention

The invention relates to a power system and, more particularly, to a power system with an overheat detection circuit.

Description of the Related Art

A general power system adjusts a duty ratio of an output circuit according to an output current. This achieves the purpose of feedback control of the output current and avoids overheating of the output circuit. However, an error might be outputted by a control circuit that used to adjust the duty ratio. Hence the function of the power system in preventing overheating is responsively impacted. In addition, since the output current is not in proportion to the temperature of the output circuit, the feedback control of the output current based on the output current only cannot accurately control the temperature of the output circuit.

BRIEF SUMMARY OF THE INVENTION

A power system is provided. The power system includes a control circuit, a power conversion circuit, a current detection circuit and a overheat detection circuit. The control circuit is for generating one or more pulse signal. The power conversion circuit is electrically coupled to the control circuit, for generating an output current according to the pulse signal. The current detection circuit is electrically coupled to the power conversion circuit, for generating a sensing current according to the output current. The overheat detection circuit is electrically coupled to the current detection circuit and the control circuit, for generating the correction current according to a temperature of the power conversion circuit.

According the disclosure, the power system of the present invention adjusts the feedback control applied to the corresponding output current according to the actual temperature of the power conversion circuit and thereby accurately maintains the temperature of the power conversion circuit low.

These and other features, aspects and advantages of the present invention will become better understood with regard to the following description, appended claims, and accompanying drawings.

DETAILED DESCRIPTION OF THE EMBODIMENTS

The term "couple" as used in the specification and claims is intended to include any direct and indirect connection means. Therefore, if it is described as the first element is coupled to the second element, the first element is directly connected to the second component through electrically connection or wireless transmission, optical transmission, and other signal connection methods, or indirectly connected to the second component by other components or connection means.

Figure 1:
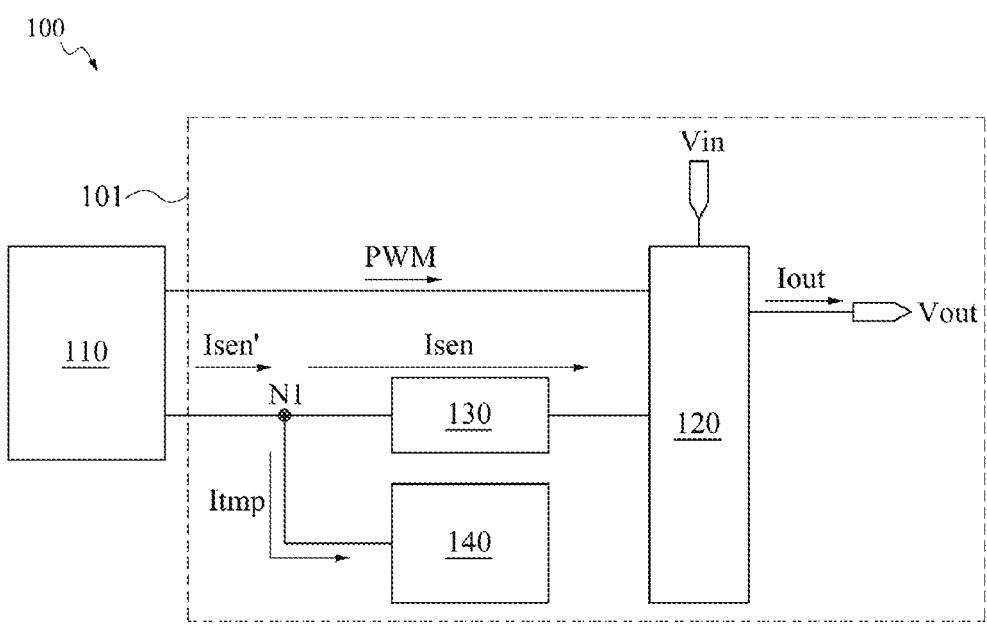
FIG. 1 is a functional block diagram of a power system according to an embodiment.

FIG. 1 is a functional block diagram of a power system 100 according to an embodiment of the present invention. As shown in FIG. 1, the power system 100 includes a control circuit 110 and a power supply unit 101, and the power supply unit 101 performs voltage conversion on the input voltage Vin according to the control circuit 110, and output the conversion result. The power supply unit 101 includes a power conversion circuit 120, a current detection circuit 130 and an overheat detection circuit 140. The current detection circuit 130 is electrically coupled between the control circuit 110 and the power conversion circuit 120. The overheat detection circuit 140 is electrically coupled to the control circuit 110 and the current detection circuit 130.

The power conversion circuit 120 generates an output current Iout and an output voltage Vout according to a pulse signal PWM generated by the input voltage Vin and the control circuit 110. When the output current Iout increases, a sensing current Isen increases, and when the output current Iout decreases, the sensing current Isen decreases. Therefore, the current detection circuit 130 receives the sensing current Isen from the control circuit 110 according to the output current Iout.

In an embodiment of FIG. 1, the overheat detection circuit 140 receives a correction current Itmp from the control circuit 110 according to the actual temperature of the power conversion circuit 120 to dynamically correct the feedback control of the control circuit 110 to the output current Iout. Specifically, when the temperature of the power conversion circuit 120 rises, the correction current Itmp increases, and when the temperature of the power conversion circuit 120 decreases, the correction current Itmp decreases.

During the operation of the power system 100, both the sensing current Isen received by the current detection circuit 130 and the correction current Itmp received by the overheat detection circuit 140 flow through the node N1 which is electrically coupled to the control circuit 110. Therefore, the control circuit 110 outputs a correction sensing current Isen', and the magnitude of the correction sensing current Isen' is equal to a sum of the magnitudes of the sensing current Isen and the correction current Itmp. That is, the current detection circuit 130 and the overheat detection circuit 140 collectively receive the correction sensing current Isen' from the control circuit 110 via the node N1.

The correction current Isen is corrected by the correction current Itmp to generate the correction sensing current Isen', and the correction sensing current Isen' is able to reflect the temperature of the power conversion circuit 120 to the control circuit 110, and then the control circuit 110 maintains the temperature of the power conversion circuit 120 in a not-overheating state. Specifically, when the temperature of the power conversion circuit 120 rises, the overheat detection circuit 140 adjusts the correction current Itmp to increase according to the temperature change of the power conversion circuit 120, and accordingly, the correction sensing current Isen' increases. At this time, the control circuit 110 decreases a duty ratio of the pulse signal PWM according to the corrected correction current Isen' to decrease the output current Iout, thereby lower the temperature of the power conversion circuit 120. When the temperature of the power conversion circuit 120 drops, the overheat detection circuit 140 adjusts the correction current Itmp to increase according to the temperature change of the power conversion circuit 120, and accordingly, the correction sensing current Isen' decreases. At this time, the control circuit 110 increase the duty ratio of the pulse signal PWM according to the corrected correction current Isen' to increase the output current Iout.

In one embodiment, the power system 100 utilizes a source-drain-on resistance current sensing method (RDS (ON) current sensing method) or a direct current resistance (DCR) current sensing method to convert the output current Iout to the sensing current Isen.

In some embodiments in which the power system 100 uses the source-drain-on resistance current measurement method, the current detection circuit 130 is implemented by a resistor having an appropriate resistance value. In other embodiments in which the power system 100 uses the direct current resistance (DCR) current sensing method, a DC resistance current measurement method is used. In other embodiments, the current detection circuit 130 is implemented with a suitable amplifier circuit and a resistor.

Figure 2:
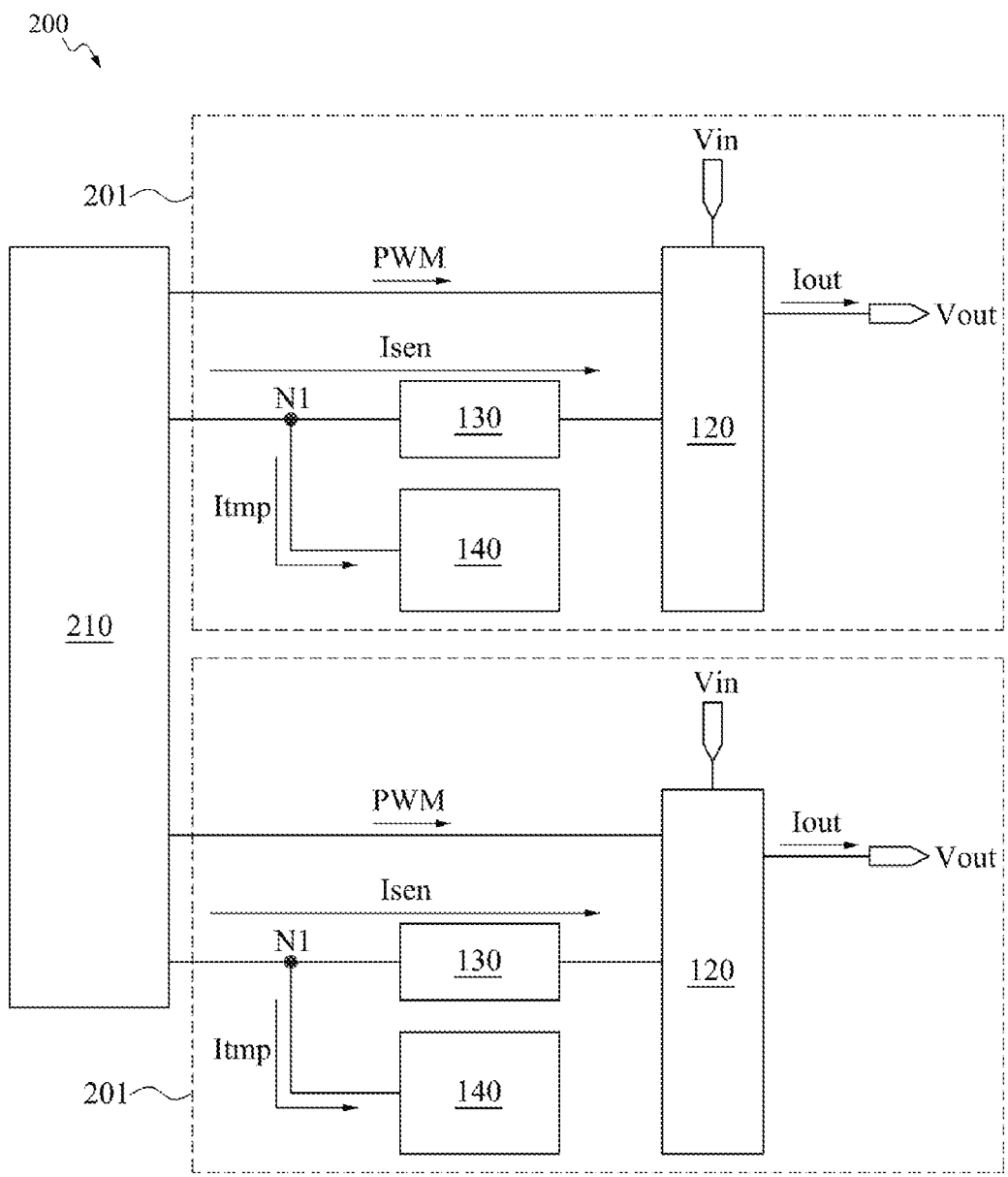
FIG. 2 is a functional block diagram of a power system according to another embodiment.

FIG. 2 is a functional block diagram of the power system 200 according to another embodiment of the present invention. As shown in FIG. 2, the power system 200 includes a control circuit 210 and a plurality of power supply units 201. The control circuit 210 is configured to generate a plurality of the pulse signals PWM. The plurality of power supply units 201 electrically coupled to the control circuit 210 respectively generate output voltages Vout and output current Iout according to the corresponding pulse signal PWM. The operation of the power supply unit 201 and the related advantages are similar to the power supply unit 101, which is not described in detail for concise purpose.

When the temperature of the power conversion circuit 120 of any power supply unit 201 rises, the control circuit 210 lowers the duty ratio of the corresponding PWM signal to decrease the output current Iout of the power supply unit 201, thereby reducing the temperature of the power conversion circuit 120 of the power supply unit 201. When the temperature of the power conversion circuit 120 of the power supply unit 201 drops, the control circuit 210 increases the duty ratio of the corresponding PWM signal to increase the output current Iout of the power supply unit 201. Therefore, the temperature of the power conversion circuit 120 of the power conversion circuit 201 is maintained in a not-overheating state.

In the embodiment of FIG. 2, even if a plurality of the power supply units 201 are located so close that thermal overlap occurs, the plurality of power supply units 201 cooperate with the control circuit 210 to maintain the temperature of the respective power conversion circuit 120 in the not-overheating state, and then the overall temperature of the power system 200 tends to be uniform.

In practice, the phases of the output voltages Vout and the output current Iout generated by the plurality of power supply units 201 are different from each other, and the number of the power supply units 201 in the power system 200 is adjustable according to actual load requirements.

In one embodiment, the power system 200 is electrically coupled to a rapidly changing load (such as a central processing unit (CPU)), the power system 200 include four power supply units 201, and the phase differences between each of the output voltages Vout are 25 degree, and the phase differences between each of the output current Iout are also 25 degrees.

Figure 3:
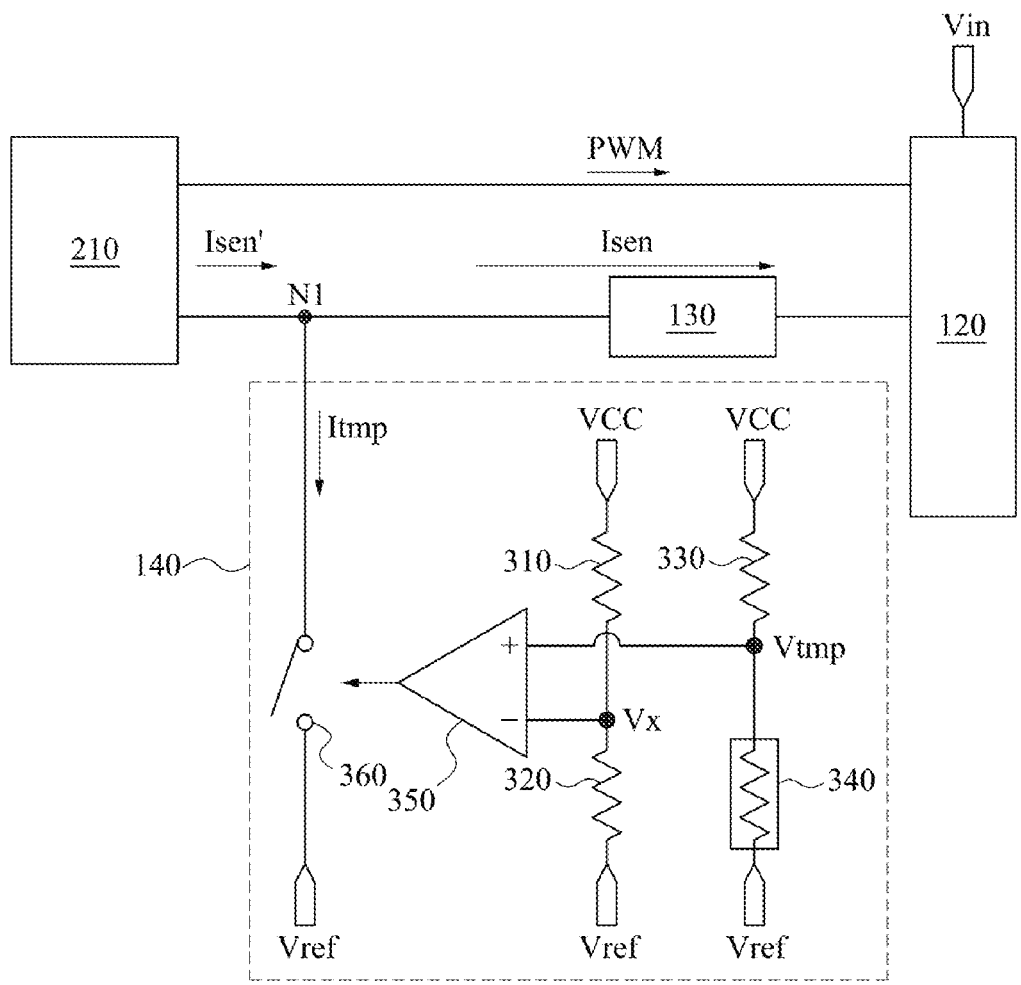
FIG. 3 is a functional block diagram of an embodiment of an overheat detection circuit of FIG. 2.

FIG. 3 is a functional block diagram of an embodiment of the overheat detection circuit 140 of FIG. 2. As shown in FIG. 3, The overheat detection circuit 140 includes a first resistor 310, a second resistor 320, a voltage dividing resistor 330, a thermistor 340, the comparison circuit 350, and a current modulation switch 360. The thermistor 340 is disposed adjacent to the corresponding power conversion circuit 120. A first terminal of the first resistor 310 is for receiving the driving voltage VCC, a second terminal of the first resistor 310 is electrically coupled to an inverting input of the comparison circuit 350. A first terminal of the second resistor 320 is electrically coupled to the second terminal of the first resistor 310, and a second terminal of the second resistor 320 is for receiving the reference voltage Vref. A first terminal of the voltage dividing resistor 330 is electrically coupled to the non-inverting input of the comparison circuit 350, a second terminal of the voltage dividing resistor 330 for receiving the driving voltage VCC. A first terminal of the thermistor 340 is electrically coupled to the first terminal of the voltage dividing resistor 330, and a second terminal of the thermistor 340 receives the reference voltage Vref. A control terminal of the current modulation switch 360 is electrically coupled to an output terminal of the comparison circuit 350, and a first terminal of the current modulation switch 360 is electrically coupled to the control circuit 210 and the corresponding current detection circuit 130 though the node N1. A second terminal of the current modulation switch 360 is used to receive the reference voltage Vref.

The first resistor 310 and the second resistor 320 are used to divide the driving voltage VCC and the reference voltage Vref to generate a regulation voltage Vx between the first resistor 310 and the second resistor 320, that is, the regulation voltage Vx is generated at an inverting input produces of the comparison circuit 350. The voltage dividing resistor 330 and the thermistor 340 are used to divide the driving voltage VCC and the reference voltage Vref to generate a temperature-sensitive voltage Vtmp between the voltage dividing resistor 330 and the thermistor 340, that is, the temperature-sensitive voltage Vtmp is generated at the non-inverting input of the comparison circuit 350. Therefore, the non-inverting input of the comparison circuit 350 receives the temperature-sensitive voltage Vtmp, and the inverting input receives the regulation voltage Vx.

In this embodiment, the thermistor 340 has a positive temperature coefficient and is disposed adjacent to the corresponding power conversion circuit 120. The driving voltage VCC is greater than the reference voltage Vref Therefore, when the temperature of the power conversion circuit 120 rises, the resistance value of the thermistor 340 increases, and thereby the temperature-sensitive voltage Vtmp increases. When the temperature-sensitive voltage Vtmp increases above the regulation voltage Vx, the comparison circuit 350 generates a switching signal SW to turn on the current modulation switch 360 to receive the correction current Itmp from the control circuit 210.

When the temperature of the power conversion circuit 120 drops, the resistance of the thermistor 340 decreases therewith which causes the temperature-sensitive voltage Vtmp to decrease. When the temperature-sensitive voltage Vtmp falls below the regulation voltage Vx, the comparison circuit 350 outputs the switching signal SW to turn off the current modulation switch 360.

In an embodiment, a current limiting resistor (not shown) is applied to be electrically coupled between the first terminal of the current modulation switch 360 and the node N1 to control the correction current Itmp within a predetermined range.

In one embodiment, the reference voltage Vref is a ground voltage, and the switch 360 is implemented using an N-type or P-type field-effect transistor.

In an embodiment, the thermistor 340 is replaced with a thermistor having a negative temperature coefficient, and the non-inverting input of the comparison circuit 350 is changed to receive the regulation voltage Vx, and the inverting input of the comparison circuit 350 is changed to receive the temperature-sensitive voltage Vtmp. Therefore, when the temperature of the power conversion circuit 120 rises, the resistance value of the thermistor having a negative temperature coefficient decreases, and the temperature-sensitive voltage Vtmp decreases. When the temperature-sensitive voltage Vtmp decreases below the regulation voltage Vx, the comparison circuit 350 turns on the current modulation switch 360.

Figure 4:
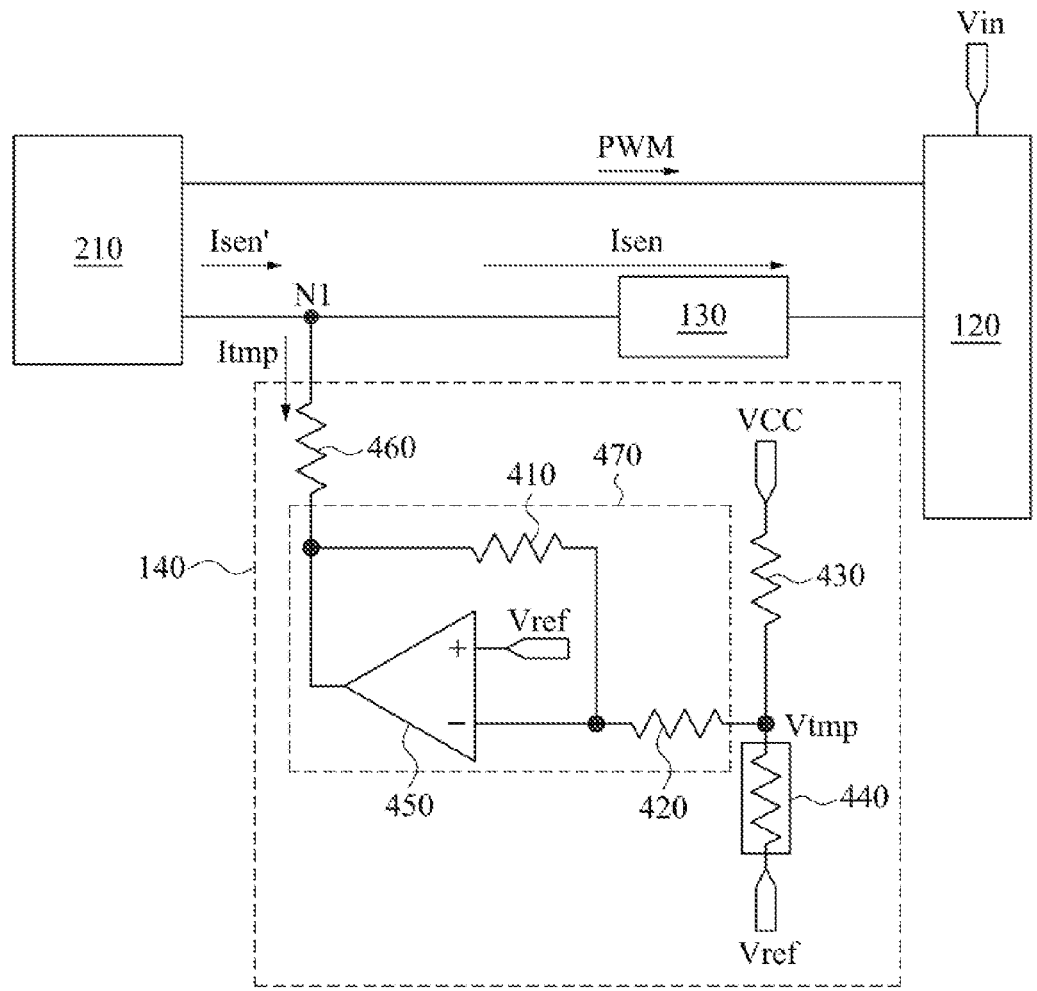
FIG. 4 is a functional block diagram of another embodiment of an overheat detection circuit of FIG. 2.

FIG. 4 is a functional block diagram of another embodiment of the overheat detection circuit 140 of FIG. 2. In the embodiment of FIG. 4, the overheat detection circuit 140 includes a first resistor 410, a second resistor 420, a voltage dividing resistor 430, a thermistor 440, a comparison circuit 450, and a current limiting resistor 460. The thermistor 440 is disposed adjacent to a corresponding power conversion circuit 120. A first terminal of the current limiting resistor 460 is electrically coupled to the control circuit 210 and a corresponding current detection circuit 130. A first terminal of the first resistor 410 is electrically coupled to a second terminal of the current limiting resistor 460. A first terminal of the second resistor 420 is electrically coupled to a second terminal of the first resistor 410, and a second terminal of the second resistor 420 is electrically coupled to a first terminal of the voltage dividing resistor 430. A first terminal of the thermistor 440 is electrically coupled to a first terminal of the voltage dividing resistor 430, and a second terminal of the thermistor 440 is configured for receiving a reference voltage Vref. A second terminal of the voltage dividing resistor 430 is configured to receive a driving voltage VCC. A non-inverting input of the comparison circuit 450 is configured for receiving a reference voltage Vref, an output terminal of the comparison circuit 450 is electrically coupled to a first terminal of the resistor 410.

The voltage dividing resistor 430 and the thermistor 440 are used to divide the driving voltage VCC and the reference voltage Vref to generate a temperature-sensitive voltage Vtmp between the voltage dividing resistor 430 and the thermistor 440. That is, the temperature-sensitive voltage Vtmp is passed to the second terminal of the second resistor 420.

In this embodiment, the thermistor 440 has a positive temperature coefficient and is disposed near the power conversion circuit 120. The driving voltage VCC is greater than the reference voltage Vref. The first resistor 410, the second resistor 420 and the comparison circuit 450 constitute an inverse amplification circuit 470, and the inverse amplification circuit 470 receives a correction current Itmp from the control circuit 210, that is, the correction current Itmp flows into the output terminal of the comparison circuit 450 via the current limiting resistor 460.

When the temperature of the power conversion circuit 120 rises, the resistance value of the thermistor 440 increases, which causes the temperature-sensitive voltage Vtmp to increase. When the temperature-sensitive voltage Vtmp increases, the voltage of the output terminal of the inverse amplification circuit 470 decreases, causing the correction current Itmp received by the inverse amplification circuit 470 from the control circuit 210 to increase.

When the temperature of the power conversion circuit 120 drops, the resistance of the thermistor 440 decreases, causing the temperature-sensitive voltage Vtmp to decrease. When the temperature-sensitive voltage Vtmp decreases, the voltage of the output terminal of the inverse amplification circuit 470 increase, causing the correction current Itmp received by the inverse amplification circuit 470 from the control circuit 210 to decrease.

The input voltage of the inverse amplifier circuit 470 has a linear relationship with the output voltage, that is, the temperature-sensitive voltage Vtmp has a linear relationship with the voltage of the output terminal of the comparison circuit 450. Therefore, it also shows a linear change between the correction current Itmp and the temperature-sensitive voltage Vtmp.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A power system, comprising:
a control circuit, for generating at least one pulse signal;
a power conversion circuit, electrically coupled to the control circuit, for generating an output current according to the pulse signal;
a current detection circuit, electrically coupled to the power conversion circuit, for generating a sensing current according to the output current; and
an overheat detection circuit, electrically coupled to the current detection circuit and the control circuit, for generating a correction current according to a temperature of the power conversion circuit;
wherein the control circuit adjusts a duty ratio of the pulse signal according to a correction sensing current to adjust the output current, and the correction sensing current is a sum of the value of the sensing current and the correction current,
wherein the overheat detection circuit comprising:
a current limiting resistor, a first terminal of the current limiting resistor is electrically coupled to the control circuit and the current detection circuit;
a first resistor, a first terminal of the first resistor is electrically coupled to a second terminal of the current limiting resistor;
a second resistor, a first terminal of the second resistor is electrically coupled to a second terminal of the first resistor, a second terminal of the second resistor is used for receiving a temperature-sensitive voltage;
a comparison circuit, a non-inverting input of the comparison circuit is used for receiving a reference voltage, an inverting input of the comparison circuit is electrically coupled to the second terminal of the first resistor, an output terminal of the comparison circuit is electrically coupled to the first terminal of the first resistor;

a voltage dividing resistor, a first terminal of the voltage dividing resistor is electrically coupled to the second terminal of the second resistor, a second terminal of the voltage dividing resistor is used for receiving the driving voltage; and a thermistor, a first terminal of the thermistor is electrically coupled to the first terminal of the voltage dividing resistor, and a second terminal of the thermistor is used to receive the reference voltage, wherein the voltage dividing resistor and the thermistor is used for dividing the driving voltage and the reference voltage to generate the temperature-sensitive voltage between the voltage dividing resistor and the thermistor.

2. The power system according to claim 1, wherein when the temperature of the power conversion circuit rises, the overheat detection circuit increases the correction current to increase the correction sensing current, and the control circuit reduces the duty ratio of the pulse signals to reduce the output current according to the increased correction sensing current.

3. The power system according to claim 1, wherein when the temperature of the power conversion circuit decreases, the overheat detection circuit reduces the correction current to reduce the correction sensing current, and the control circuit increases the duty ratio of the pulse signals to increase the output current according to the reduced correction sensing current.

4. The power system according to claim 1, wherein when the temperature-sensitive voltage increases, a voltage of the output terminal of the comparison circuit is reduced to increase the correction current, and when the temperature-sensitive voltage decreases, the voltage of the output terminal of the comparison circuit increases to reduce the correction current.

5. The power system according to claim 1, wherein, the thermistor has a positive temperature coefficient.

* * * * *